US008621618B1

(12) United States Patent
Ramsey et al.

(10) Patent No.: US 8,621,618 B1
(45) Date of Patent: Dec. 31, 2013

(54) SYSTEM AND METHOD FOR ASSESSING WHETHER A COMMUNICATION CONTAINS AN ATTACK

(75) Inventors: Jon R. Ramsey, Atlanta, GA (US); Jyotish S. Varma, Atlanta, GA (US); Ashley Thomas, Atlanta, GA (US); Kevin J. Schmidt, Liburn, GA (US); Joseph Neal Stewart, Myrtle Beach, SC (US); Rudy Alexander Ristich, Wheaton, IL (US); Joan Pepin, Mountain View, CA (US)

(73) Assignee: Dell Products, LP, Round Rock, TX (US)

( * ) Notice: Subject to any disclaimer, the term of this patent is extended or adjusted under 35 U.S.C. 154(b) by 192 days.

(21) Appl. No.: 12/931,659

(22) Filed: Feb. 7, 2011

(51) Int. Cl.
G06F 21/00 (2013.01)
(52) U.S. Cl.
USPC ............. 726/22; 370/392; 370/400; 709/206; 713/153; 713/150; 713/186
(58) Field of Classification Search
USPC .......................................................... 726/22
See application file for complete search history.

(56) References Cited

U.S. PATENT DOCUMENTS

| | | | | |
|---|---|---|---|---|
| 7,711,779 B2 * | 5/2010 | Goodman et al. | ............ | 709/206 |
| 7,990,982 B2 * | 8/2011 | Duffield et al. | ............... | 370/400 |
| 8,042,181 B2 * | 10/2011 | Judge | .............................. | 726/22 |
| 8,327,442 B2 * | 12/2012 | Herz et al. | ....................... | 726/23 |
| 2006/0050704 A1 * | 3/2006 | Malloy et al. | ................. | 370/392 |
| 2006/0212931 A1 * | 9/2006 | Shull et al. | ....................... | 726/10 |
| 2008/0229415 A1 * | 9/2008 | Kapoor et al. | .................. | 726/22 |
| 2010/0050260 A1 * | 2/2010 | Nakakoji et al. | ................ | 726/23 |
| 2010/0150004 A1 * | 6/2010 | Duffield et al. | ............... | 370/252 |
| 2011/0093792 A1 * | 4/2011 | Frayman et al. | .............. | 715/752 |

OTHER PUBLICATIONS http://www.cyber.st.dhs.gov/docs/phishing-dhs-report.pdf|Online Identity Theft:Phishing Technology, Chokepoints and Countermeasures|Aaron Emigh|Revision 1.3, Oct. 3, 2005|pp. 1-19.*

* cited by examiner

Primary Examiner — Mahfuzur Rahman
(74) Attorney, Agent, or Firm — Larson Newman, LLP (57) ABSTRACT

Communications can be processed with multiple countermeasures to identify attacks. Each countermeasure can compute a probability of a communication containing an attack and an accompanying confidence score indicating confidence in the probability. Combining the probabilities can produce a composite probability and associated confidence of the communication containing an attack. The composite probability and confidence scores can be produced from a weighted combination of the individual countermeasure probabilities and confidence scores. Weighting factors can be generated or obtained from a database that stores profiles of confirmed attacks.

23 Claims, 7 Drawing Sheets

SYSTEM AND METHOD FOR ASSESSING WHETHER A COMMUNICATION CONTAINS AN ATTACK

FIELD OF THE TECHNOLOGY

This application relates generally to the field of information security, and more specifically to assessing whether network traffic or log messages contain an attack by conducting multiple countermeasures assessments and weighting the results of each countermeasure assessment according to historical attack profiles, typically from multiple clients.

BACKGROUND

Access to the Internet and other wide area networks (WANs) has become pivotal to many businesses and other organizations, including for email, research, information exchange, and content delivery. This access offers an organization tremendous improvement in productivity and flexibility. Unfortunately, criminals located at remote locations attempt to use the organization's Internet/WAN access as a doorway for attacking the organization.

Most networks that provide an interface to the Internet can be a target of an attack. Some attacks involve attempts to gain access to digital assets and private data, for example to steal, alter, or destroy information. Other attacks are designed to degrade or hamper performance of a device connected to a network or to impair a section of a network or an entire network. As will be appreciated by those skilled in the art, attacks come in many different forms, and attack technologies are ever evolving and becoming more sophisticated.

Conventional attack detection systems are typically limited in terms of analysis type and sophistication, are usually confined to utilizing information from one network or site, and are often one dimensional. For example, one conventional approach entails subjecting communications to a single countermeasure assessment aimed at determining whether a communication may contain an attack or malicious event. While this approach may identify many attacks, other attacks may evade detection. Moreover, a communication may be flagged as containing an attack when no actual attack exists. Conventional technologies often tradeoff between false positives and false negatives. Reducing the number of attacks that go undetected comes at the expense of labeling more legitimate communications as containing an attack. Likewise, deceasing the rate of reporting benign communications as threatening comes at the expense of failing to identify actual attacks.

Accordingly, need is apparent for improved attack detection technology. Need exists for an attack detection system that can perform a multidimensional assessment on communications. Need also exists for an attack detection system that can combine the results of multiple countermeasure assessments, to deliver an assessment providing improved false negative performance and improved false positive performance. Need further exists for an attack detection system that can utilize historical attack information to select countermeasure assessments or a weighted combination of countermeasure assessments that will provide suitable performance under a current set of operating conditions or for particular communications. Need further exists for information security technology that can detect attacks by leveraging attack information aggregated across diverse networks and/or network sites, and/or clients. A capability addressing one or more such needs, or some other related deficit in the art, would promote network security and would improve the benefits an organization can achieve through remote network access.

SUMMARY

The present invention supports identifying communications containing attacks. The term "communication," as used herein, refers to network traffic or one or more log messages. Thus, network traffic is a form of a communication, and a log message is a form of a communication. The term "communications," as used herein, is the plural form of "communication." Communications can include two or more instances of network traffic, two or more log messages, or two or more instances of network traffic and log messages.

In one aspect of the present invention, multiple countermeasure assessments can process one or more communications towards identifying attacks. Each countermeasure assessment can produce a respective probability that a communication contains an attack and an associated confidence in that probability. An engine can use probability inference to consume results of the multiple countermeasure assessments and create a composite probability score with an associated confidence. The engine can reconfigure itself based on a perspective of multiple clients for multiple countermeasure classes.

In a further aspect of the present invention, the communication can also be characterized according to one or more parameters. For example, the communication can be characterized according to a destination, user, or consumer of the traffic, such as according to industry or economic sector, client or organization, site, and/or device. A database can maintain profiles of historical communications deemed to have contained attacks, including results of the countermeasure assessments and the parameters. Referencing the parameters of the communication to the database can identify countermeasure assessments that reliably identified attacks in communications having similar parameters. A composite probability of the communication containing an attack and an associated confidence can be computed from a weighted or biased combination of the countermeasure assessment results. Weights or biasing factors can be based on historical performance of each countermeasure assessment as determined from the database.

The discussion of detecting attacks presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, methods, features, advantages, and objects of the present invention will become apparent to one with skill in the art upon examination of the following drawings and detailed description. It is intended that all such aspects, systems, methods, features, advantages, and objects are to be included within this description, are to be within the scope of the present invention, and are to be protected by the accompanying claims.

Many aspects of the invention can be better understood with reference to the above drawings. The elements and features shown in the drawings are not to scale, emphasis instead being placed upon clearly illustrating the principles of exemplary embodiments of the present invention. Moreover, certain elements may be exaggerated in size to help visually convey such principles. In the drawings, reference numerals designate like or corresponding, but not necessarily identical, elements throughout the several views.

DETAILED DESCRIPTION OF EXEMPLARY EMBODIMENTS

Exemplary embodiments of the present invention can determine or assess whether network traffic or one or more network transmissions or one or more log messages contains an attack. A detected attack can be dispersed or otherwise spread among multiple transmissions or messages that may arrive sequentially or sporadically. A detected attack may have been either launched from a single remote network location or initiated from multiple locations dispersed across a network or information technology ("IT") infrastructure. In certain embodiments, detecting the attack can comprise weighing, fusing, compiling, and/or correlating results from multiple countermeasure assessments.

The present invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples," "embodiments," and "exemplary embodiments" given herein are intended to be non-limiting, and among others supported by representations of the present invention.

This document includes sentences, paragraphs, and passages (some of which might be viewed as lists) disclosing alternative components, elements, features, functionalities, usages, operations, steps, etc. for various embodiments of the present invention. Unless clearly stated otherwise, all such lists, sentences, paragraphs, passages, and other disclosures are not exhaustive, are not limiting, are provided in the context of describing representative examples and variations, and are among others supported by various embodiments of the present invention. Accordingly, those of ordinary skill in the art having benefit of this disclosure will appreciate that the present invention is not constrained by any such lists, examples, or alternatives. Moreover, the inclusion of lists, examples, embodiments, and the like will help guide those of ordinary skill in practicing many more implementations and instances of the present invention without undue experimentation, all of which are intended to be within the scope of the claims.

This disclosure includes figures and discussion in which features and elements of certain embodiments have been organized into functional blocks, subsystems, or modules. And, certain processes and methods have been organized into steps. Such organization is intended to enhance readership and to facilitate teaching the reader about working principles of the present invention and about making and using an abundance of embodiments of the present invention. The organization is not intended to force any rigid divisions or partitions that would limit the present invention. In practice, the flexibility of the present invention supports dispersing or grouping functionalities, elements, and features in many different ways. The inclusion of an element or function in one block, module, or subsystem verses another can be substantially arbitrary in many instances, with the divisions being soft and readily redrawn using ordinary skill and this rich disclosure. Accordingly, functional blocks, modules, subsystems, and the like can be combined, divided, repartitioned, redrawn, moved, reorganized, or otherwise altered without deviating from the scope and spirit of the present invention. This is not to say that, nor will it support a conclusion that, the disclosed organizations and combinations are not novel, are not innovative, or are obvious.

Figure 1A:
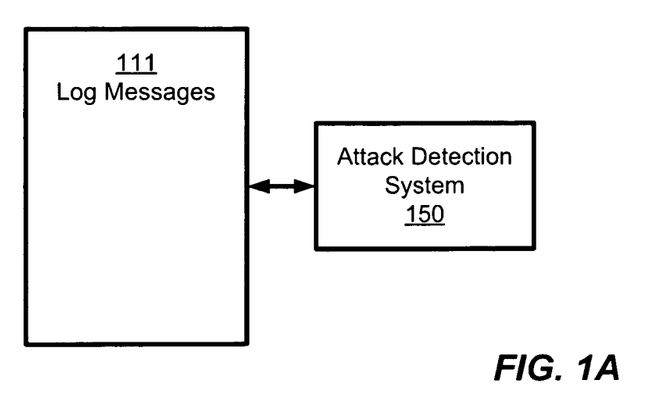
FIG. 1A is a functional block diagram of a deployment of an attack detection system according to certain exemplary embodiments of the present invention.
Figure 1B:
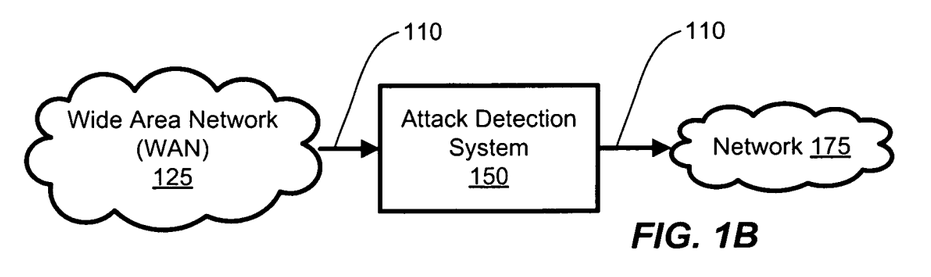
FIG. 1B is a functional block diagram of a deployment of an attack detection system according to certain exemplary embodiments of the present invention.
Figure 2A:
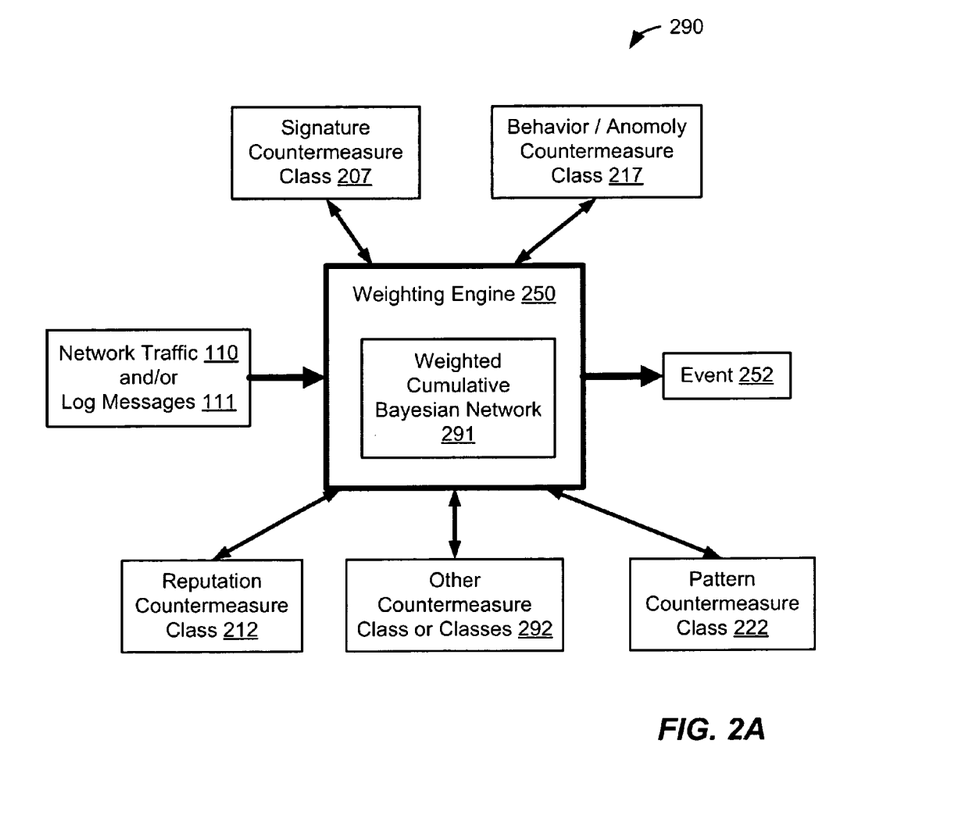
FIG. 2A is a functional block diagram of an attack detection system according to certain exemplary embodiments of the present invention.
Figure 2B:
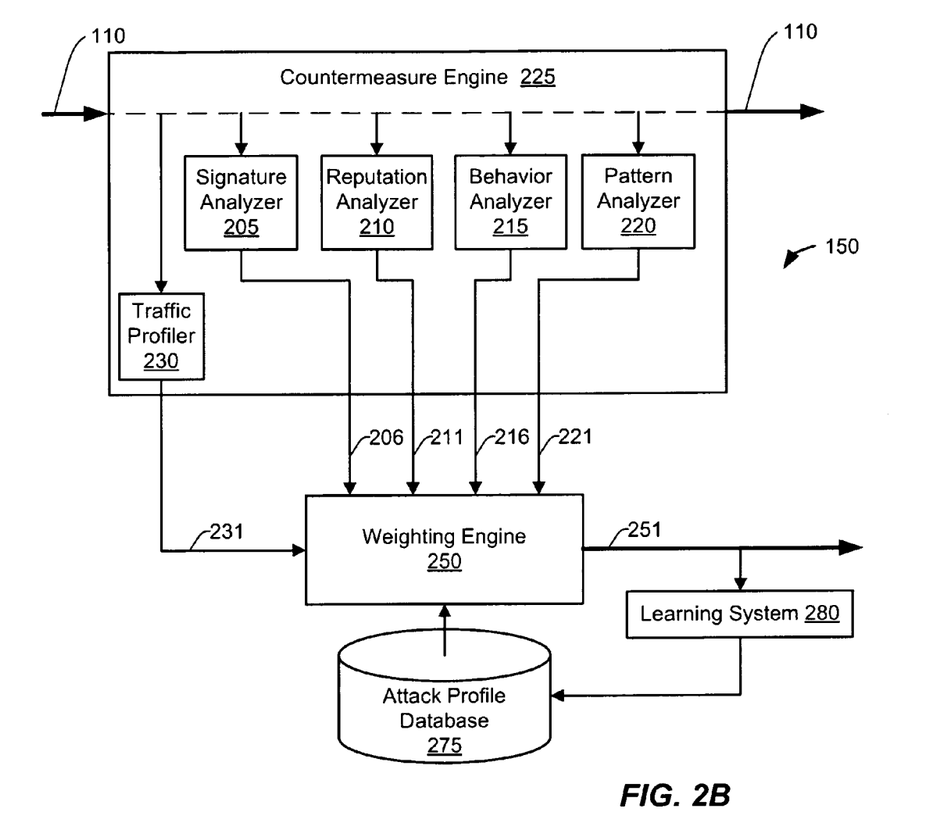
FIG. 2B is a functional block diagram of an attack detection system according to certain exemplary embodiments of the present invention.
Figure 3A:
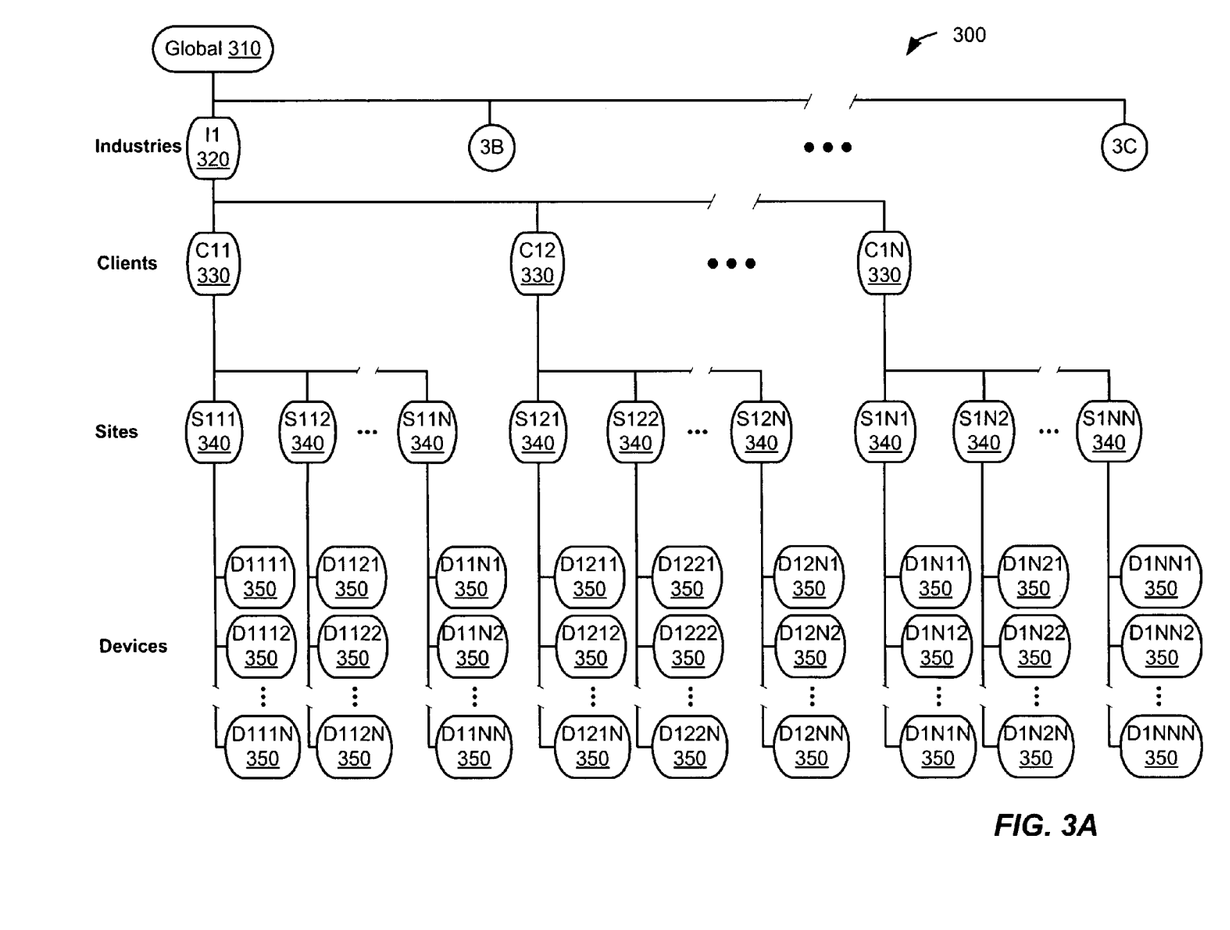
FIGS. 3A, 3B, and 3C (collectively FIG. 3) are a diagram illustrating relationships among parameters relevant to detecting attacks according to certain exemplary embodiments of the present invention.
Figure 3B:
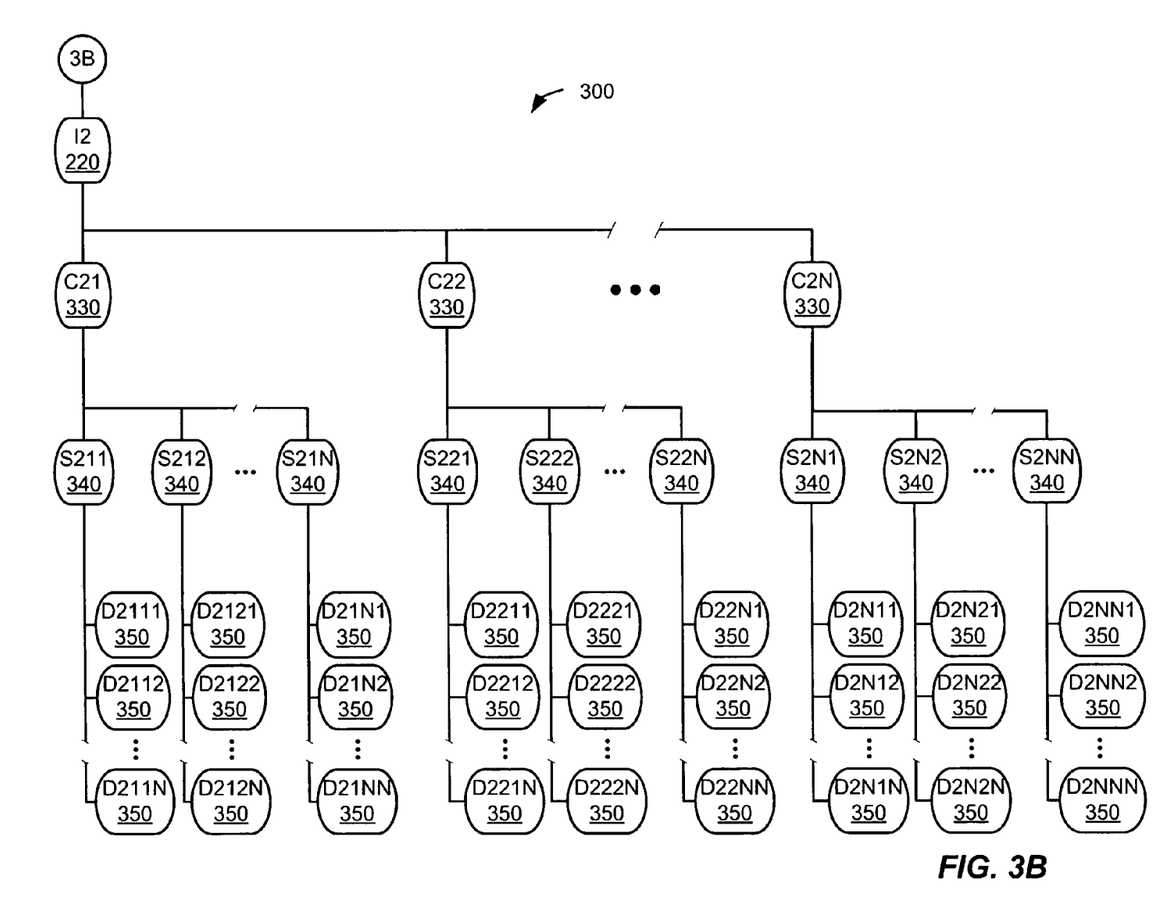
Figure 3C:
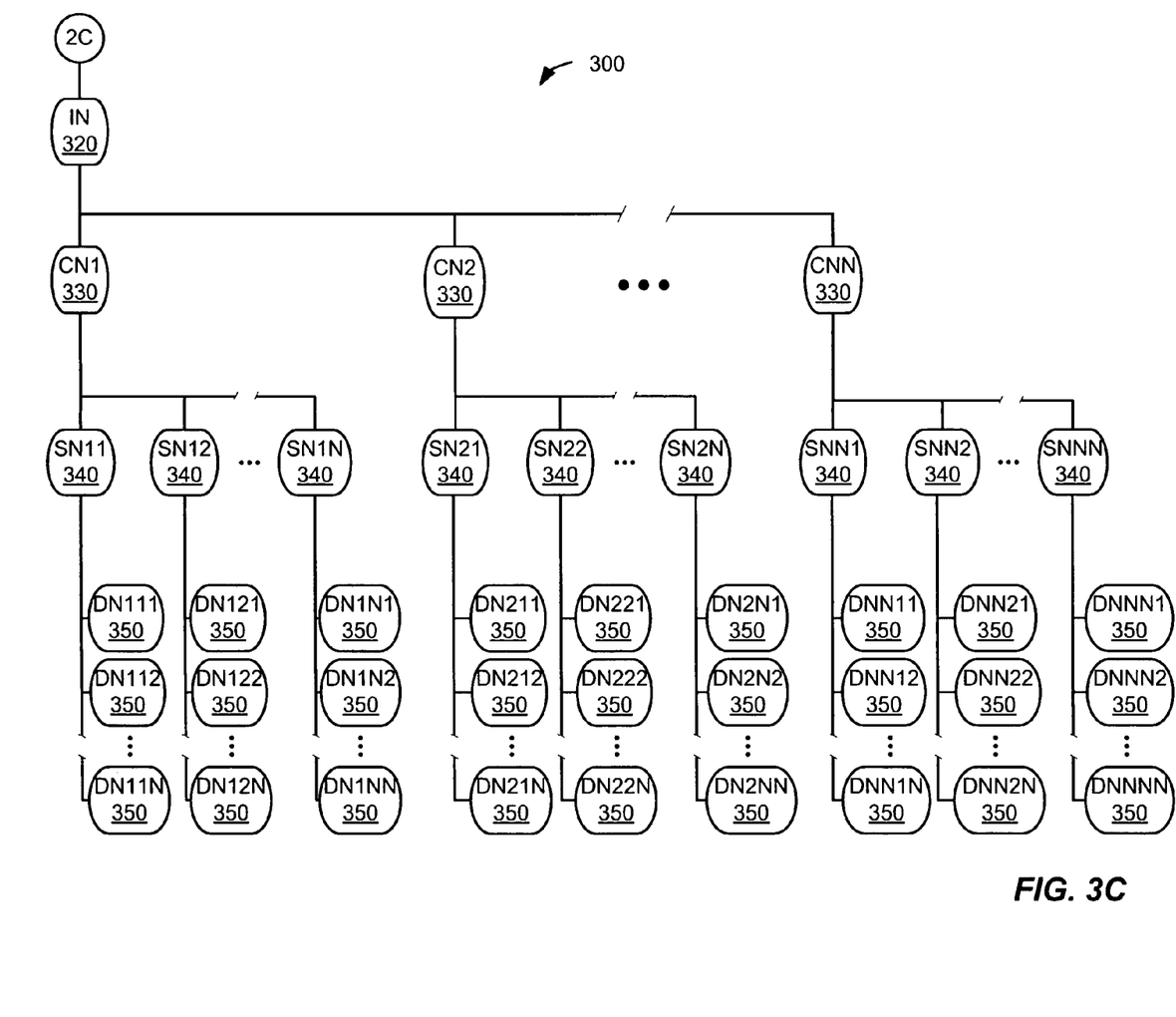
Figure 4:
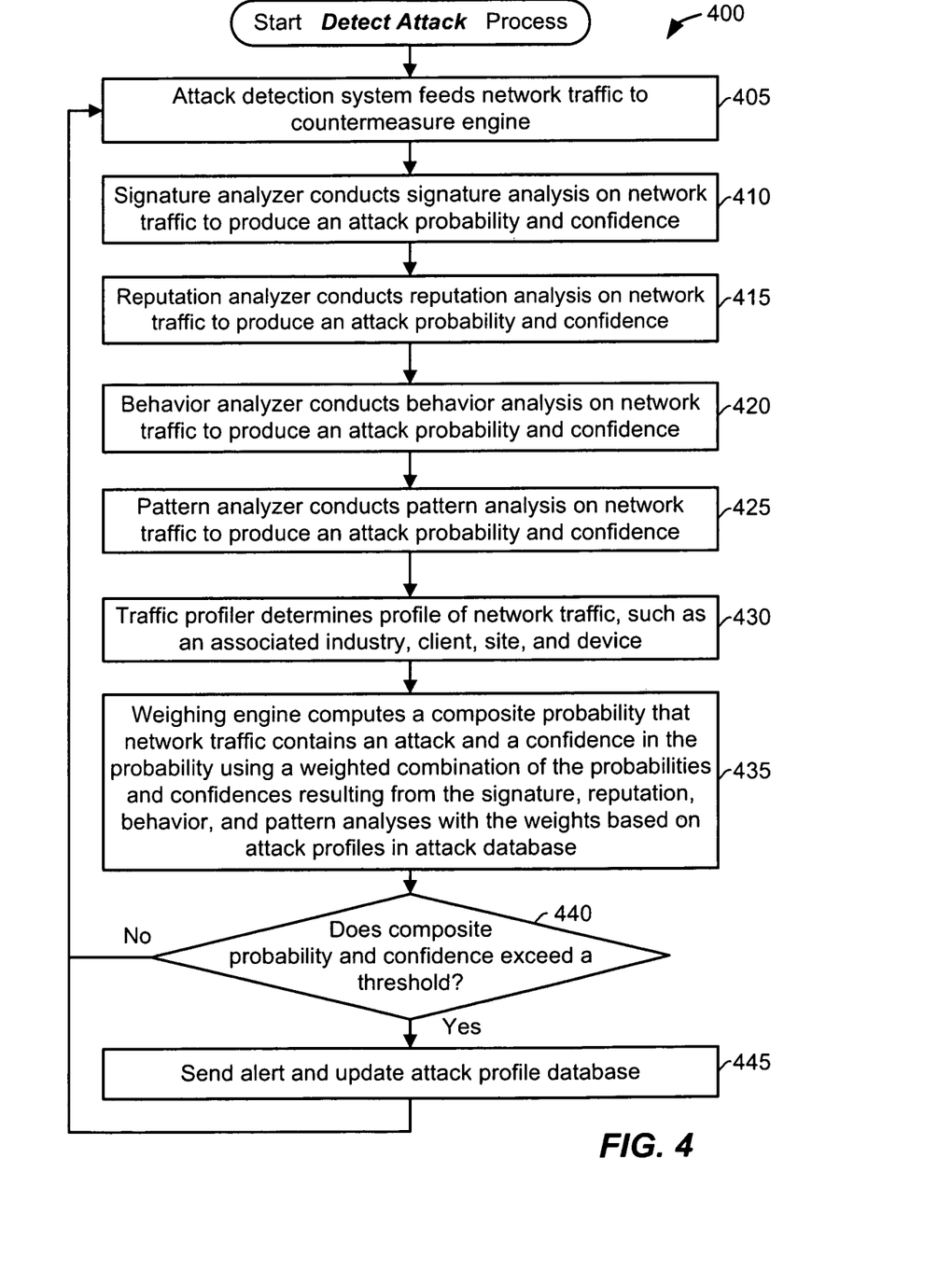
FIG. 4 is a flowchart for an attack detection process according to certain exemplary embodiments of the present invention.

Technology for detecting attacks with now be described more fully with reference to FIGS. 1A, 1B, 2A, 2B, 3, and 4, which describe representative embodiments of the present invention. FIGS. 1A and 1B describe representative operating environments for detecting attacks. FIGS. 2A and 2B describe representative systems for detecting attacks. FIG. 3 describes representative relationships for certain traffic parameters relevant to attack detection. FIG. 4 describes a representative method for detecting attacks.

Turning now to discuss the figures, FIG. 1A illustrates a functional block diagram of an exemplary deployment of an attack detection system 150 in accordance with certain embodiments of the present invention. In the embodiment of FIG. 1A, the attack detection system 150 identifies attacks associated with log messages 111. The attack detection system 150 can be applied to firewall logs, server logs, and desktop logs, to mention a few representative examples. Moreover, the attack detection system 150 is applicable to a wide range of systems (including hardware, static or transmitting data, software, or flowing signals) that log events within or for an IT infrastructure. Such systems can include routers, switches, servers, firewalls, and various other network and information appliances and computing systems.

FIG. 1B also illustrates a functional block diagram of an exemplary deployment of an attack detection system 150 in accordance with certain embodiments of the present invention. In the embodiment of FIG. 1B, the attack detection system 150 identifies attacks associated with network traffic 110, and may further identify attacks associated with one or more log messages 111. The embodiment of FIG. 1B will be discussed in further detail below largely referencing network traffic 110 in the context of a representative example. Those of ordinary skill in the art having benefit of this disclosure will appreciate that the present disclosure and teaching enables one of ordinary skill in the art to make and use attack detection systems 150 for identifying attacks associated with network traffic 110 and log messages 111 without undue experimentation. Accordingly, while reference is made below to "network traffic," one or ordinary skill in the art having benefit of this disclosure can readily practice the present invention for communications, which can include network traffic 110 and log messages 111, as discussed above.

Referring now to FIG. 1B, as will be discussed in further detail below, the attack detection system 150 assesses whether network traffic 110 flowing between the wide area network 125 and the network 175 contains an attack. In the illustrated embodiment, the attack detection system 150 is located between a wide area network 125 and another network 175. In certain exemplary embodiments, the attack detection system 150 comprises multiple units that are located at different network sites and that are collaborating with one another and/or sharing information among one another. For example, attack detection systems 150 can be located at or otherwise associated with network devices, agent software, security operations center, routers, switches, firewalls, and/or local area network sites, to mention a few representative examples.

In certain exemplary embodiments, the attack detection system 150 comprises a unit located at a node at which human agents analyze threats and/or a unit located at a node at which a client analyzes threats. Either or both of such nodes can be disposed on the client side of a firewall that separates the client from the Internet or another wide area network. Another unit can be located between the firewall and the Internet. One or more additional units can be located at remote Internet sites, for example associated with other clients or at a global facility that serves multiple clients, for example operated by a supplier of the units or a provider of attack detection services. Each unit of these units can comprise an instance of a system as illustrated in FIGS. 2A and 2B, such that each unit has a distinct countermeasure engine (see FIGS. 2A and 2B below). Accordingly, in certain embodiments, the attack detection system 150 assesses network traffic 110 at one site based on information shared among a dispersed network of units.

In certain exemplary embodiments, the attack detection system 150 can be implemented from the client premise equipment all the way to a network core or backbone. Such a depth of implementation can provide scalability and can support a capability to identify attacks in network traffic 110 at network endpoints.

The term "network traffic," as used herein, generally refers to traffic flowing on a network, onto a network, or out of a network. Accordingly, network traffic can comprise one or more messages or information-bearing signals propagating on or over a network or entering or exiting a network. Such messages or signals might be associated with one another, for example forming a series or traveling towards a common destination or from a common source. The network can comprise free space, such as in a cellular, wireless, or satellite network; optical fiber, such as in a fiber optic network; or electrical conductors for transmitting electrical signals, to mention a few examples without limitation.

The wide area network 125 can comprise the Internet or another network supporting remote connectivity. For example, the wide area network 125 can comprise a regional area network or a metropolitan area network.

In one exemplary embodiment, the network 175 can comprise a local area network ("LAN"). In one exemplary embodiment, the network 175 can comprise a secure network. In one exemplary embodiment, the network 175 can comprise a service area network ("SAN"). In one exemplary embodiment, the network 175 can comprise a private network. In one exemplary embodiment, the network 175 can comprise a network that is owned by, operated by, or specific to one organization. For example, the network 175 might be located on a campus of a university or a major corporation, in a building having multiple tenants, or within a complex of buildings occupied by a single institution. In one exemplary embodiment, the network 175 can comprise a network that is run, operated, and/or owned by a government or a government branch. Those of ordinary skill in the art having benefit of this disclosure will appreciate that the present technology is applicable to a wide variety of operating environments and supports a wide range of network types and architectures and that this rich disclosure enables deployment across such environments and networks without undue experimentation.

Turning now to FIG. 2A, this figure illustrates a functional block diagram of an attack detection system 150 in accordance with certain embodiments of the present invention. In the illustrated embodiment of the system 290, the weighting engine 250 comprises a weighted cumulative Bayesian network 291. The weighting engine 250 analyzing network traffic 110 and/or log messages 111 (communications) utilizing countermeasure assessments. As illustrated, the countermeasure assessments can include one or more assessments within the signature countermeasure class 207, one or more assessments within the behavior or anomaly countermeasure class 217, one or more assessments within the reputation countermeasure class 212, one or more assessments within the pattern countermeasure class 222, and/or one or more assessments within one or more another countermeasure classes. In an exemplary embodiment, the Bayesian network 291 will utilize assessments from at least two countermeasure classes. As will be discussed in further detail below, an event 252 results from processing of the weighting engine 250, and the event 252 can include output of a probability and associated confidence of an attack, a prompt, a message, a database update, a transmission blockage, or some other appropriate action.

Turning now to FIG. 2B, this figure illustrates a functional block diagram of an attack detection system 150 in accordance with certain embodiments of the present invention. FIG. 2B can be viewed as an exemplary embodiment of the system 290 illustrated in FIG. 2A and described above. As discussed above with reference to FIGS. 1A and 1B, in various embodiments, the attack detection system 150 illustrated in FIGS. 1A and 1B can comprise one or more of the systems illustrated in FIG. 2B and those systems can either be collocated or located at multiple network sites that are remote with respect to one another.

The embodiment of the attack detection system 150 illustrated in FIG. 2B comprises a countermeasure engine 225 that applies multiple countermeasure assessments to network traffic 110 and further profiles the network traffic 110. In an exemplary embodiment, the countermeasure engine 225 can be implemented as one or more computer programs.

The term "countermeasure," as used herein, generally refers to a technology, process, or system that is used to counter an attack or an attacker. The term "countermeasure assessment," as used herein, generally refers to a method for determining whether network traffic contains an attack (or otherwise detecting or identifying an attack), wherein a computer conducts at least one step of the method via executing code. The term "computer-implemented countermeasure assessment," as used herein generally refers to a countermeasure assessment that is carried out on a programmable computer.

In the illustrated embodiment, the countermeasure engine 225 comprises a signature analyzer 205, a reputation analyzer 210, a behavior analyzer 215, and a pattern analyzer 220. The signature analyzer 205, the reputation analyzer 210, the behavior analyzer 215, and the pattern analyzer 220 each conducts a different class of countermeasure assessment. Accordingly, the illustrated countermeasure engine 225 conducts four different classes of countermeasures. Other embodiments may conduct a larger or smaller number of countermeasures using fewer or more classes.

The signature analyzer 205 conducts a countermeasure assessment that comprises and may be based on a signature analysis. In an exemplary embodiment, the result 206 of this countermeasure assessment comprises a probability that the network traffic 110 contains an attack and a confidence score indicating a confidence in that probability. In certain exemplary embodiments, the signature analyzer 205 conducts a computer-implemented countermeasure assessment. In certain embodiments, one or more humans may execute one or more steps in the countermeasure assessment. In one exemplary embodiment, the signature analyzer 205 is implemented as one or more computer programs.

The reputation analyzer 210 conducts a countermeasure assessment that comprises and may be based on a reputation analysis. In an exemplary embodiment, the result 211 of this countermeasure assessment comprises a probability that the network traffic 110 contains an attack and a confidence score indicating a confidence in that probability. In certain exemplary embodiments, the reputation analyzer 210 conducts a computer-implemented countermeasure assessment. In certain embodiments, one or more humans may execute one or more steps in the countermeasure assessment. In one exemplary embodiment, the reputation analyzer 210 is implemented as one or more computer programs.

The behavior analyzer 215 conducts a countermeasure assessment that comprises and may be based on a behavior analysis. In an exemplary embodiment, the result 216 of this countermeasure assessment comprises a probability that the network traffic 110 contains an attack and a confidence score indicating a confidence in that probability. In certain exemplary embodiments, the behavior analyzer 215 conducts a computer-implemented countermeasure assessment. In certain embodiments, one or more humans may execute one or more steps in the countermeasure assessment. In one exemplary embodiment, the behavior analyzer 215 is implemented as one or more computer programs.

The pattern analyzer 220 conducts a countermeasure assessment that comprises and may be based on a pattern analysis. In an exemplary embodiment, the result 221 of this countermeasure assessment comprises a probability that the network traffic 110 contains an attack and a confidence score indicating a confidence in that probability. In certain exemplary embodiments, the pattern analyzer 220 conducts a computer-implemented countermeasure assessment. In certain embodiments, one or more humans may execute one or more steps in the countermeasure assessment. In one exemplary embodiment, the pattern analyzer 220 is implemented as one or more computer programs.

Exemplary operations of the signature analyzer 205, the reputation analyzer 210, the behavior analyzer 215, and the pattern analyzer 220 will be further discussed below with reference to FIG. 4. As discussed above with reference to FIG. 2A, various other countermeasure assessments can be utilized in addition to those illustrated in FIG. 2B or in substitution to those illustrated in FIG. 2B.

The countermeasure engine 225 further comprises a traffic profiler 230 that provides a profile 231 of the network traffic 110. In an exemplary embodiment, the traffic profiler 230 can be implemented as one or more computer programs. In certain exemplary embodiments, the profile 231 of the network traffic 110 can be ascertained from a destination address of the network traffic 110. For example, a destination address of a packet can be specific to a recipient device at a site of a client. Further, the location or user of the attack detection system 150 illustrated in FIG. 2B can correlate with the profile 231. In certain embodiments, the network location of the attack detection system 150 may define part or all of the profile 231, for example if the attack detection system 150 was attached to a payroll system at a particular site of a particular company.

The term "profile," as used herein to with reference to communication(s), log message(s), or network traffic, generally refers to a set, group, or plurality of parameters specific to or otherwise associated with a destination, user, recipient, or consumer of the communication(s), log message(s), or network traffic. The term "attack profile," as used herein, refers to a profile of one or more communications, log messages, or network traffic that has been deemed to contain an attack.

The attack profile database 275 contains profiles 231 of previous network traffic deemed to have contained actual attacks, for example where an attack was confirmed. Each entry in the attack profile database 275 records a profile 231 of such network traffic along with the results 206, 211, 216, and 221 of countermeasure assessments conducted on that traffic. Additional information associated with the traffic may also be recorded, for example time of transmission and the traffic itself.

In one exemplary embodiment, one attack profile database 275 serves multiple attack detection systems 150. For example, a global network of attack detection systems 150 can access a common attack profile database 275 located at a central site. Alternatively, each attack detection system 150 can have a dedicated attack profile database 275 that may be updated from a central facility, for example.

The weighting engine 250 receives and processes the results 206, 211, 216, and 221 of the countermeasure assessments respectively conducted by the signature analyzer 205, the reputation analyzer 210, the behavior analyzer 215, and the pattern analyzer 220 to compute a composite result 251. In an exemplary embodiment, the weighting engine 250 can be implemented as one or more computer programs. The composite result 251 provides a probability that the network traffic 110 contains an attack and an associated confidence in that probability based on a weighted combination of the results 206, 211, 216, and 221.

As will be discussed below with reference to FIG. 4, the weighting engine 250 can weight each of the results 206, 211, 216, and 221 based on historical performance of the signature, reputation, behavior, and pattern analyses in detecting attacks on analogous network traffic 110. In an exemplary embodiment, the weighting engine 250 queries the attack profile database 275 using the profile 231 of the network traffic 110 under analysis. In response, the attack profile database 275 returns one or more database entries for attacks occurring in network traffic 110 having a profile 231 similar to the profile 231 of the network traffic under analysis. The weighting engine 250 then determines which of the signature, reputation, behavior, and pattern analyses (or which combination of the signature, reputation, behavior, and pattern analyses) best identified an attack under similar profile conditions.

For example, assume that the behavior analysis and the pattern analysis had a solid historical track record of success detecting attacks for commonly profiled network traffic 110, and that the signature and reputation analyses had both performed poorly. Under this hypothetical scenario, the weighting engine 250 could weight the results 216 and 221 provided by the behavior analyzer 215 and the pattern analyzer 220 more heavily than the results 206 and 211 from the signature and reputation analyzers 205, 210. Accordingly, the weighting engine 205 can produce a composite result 251 that weights results 206, 211, 216, 221 according to predictive strength demonstrated under similar operating conditions.

When the composite results 251 meet a threshold indicating that the network traffic 100 contains an attack, the results 206, 211, 216, and 221 and the composite results 251 are stored in the attack profile database 275 along with the profile 231 of the network traffic 110 and other relevant information. Additionally, an alert can be transmitted to appropriate devices and parties to take action. In certain exemplary embodiments, the threshold for updating the attack profile database 275 and the alerting threshold are substantially different than one another. Moreover, a threshold applied to an attack probability can be different than a threshold applied to a confidence level.

Turning now to FIG. 3, this figure illustrates relationships among exemplary parameters relevant to detecting attacks in accordance with certain embodiments of the present invention. The illustrated diagram depicts an exemplary hierarchy 300 of parameters for network traffic. In an exemplary embodiment, a profile 231 of a network transmission can comprise a set of parameters from the illustrated hierarchy 300. For example, a profile 231 can comprise at least one parameter from two, three, or four levels of the hierarchy 300.

An exemplary profile 231 could include an industry parameter 320, a client parameter 330, a site parameter 340, and a device parameter 350. Thus, an exemplary profile 231 having four dimensions could be the set (government, U.S. Department of Defense, Pentagon, publicly accessibly printer located in public library).

The illustrated levels of the exemplary hierarchy 300 branch from the global level 310. The global level 310 can denote a worldwide (or Internet wide) system of attack detection systems 150 provided by a common supplier, providing information to a common recipient, or sharing information about attacks. Accordingly, all the attack detection systems 150 represented by the hierarchy 300 can report attack information to one entity or a central site, such as an operation maintained by a supplier of the attack detection systems 150. In this manner, the attack profile database 275 of each attack detection system 150 can utilize and benefit from attack information provided by a global network of attack detection systems 150.

The industry parameters 320 specify an industry or economic sector associated with the network traffic 110 under assessment or of the user of the attack detection system 150, which may be the same. An industry parameter 320 may specify banking, business services, channel partner, credit union, education, government, health care, heavy industry, hospitality, hospitals, insurance, manufacturing, media, membership organization, miscellaneous financial, other, other services, retail, technology provider, telecom, transportation, or utilities, to mention a few representative examples.

The client parameters 300 specify the organization, entity, institution, or business that the attack detection system 150 serves and/or that the network traffic 110 receives. For example, the attack detection system 150 could be owned, leased, or used by the U.S. Department of Defense, a specific Fortune 500 company, a private company, or an individual. In an exemplary embodiment, each industry may have multiple clients. For example, multiple banks may fall within a banking industry.

The site parameters 340 specify the site served by the attack detection system 150 and/or the network traffic 110 that is under assessment. The specified site might be a physical or geographical location or premises. For example, a publicly traded bank may have hundreds of sites in the form of branches located in various cities and neighborhoods.

The device parameters 350 specify the device or devices served by the attack detection system 150 and/or the network traffic 110 that is under assessment. For example, a specific bank branch located at a specific site may have multiple printers, financial processing computers, personal computers, ATM machines, and databases, each having a distinct device parameter 350.

Turning now to FIG. 4, this figure illustrates a flowchart for an attack detection process 400 in accordance with certain embodiments of the present invention. The attack detection process 400, which is entitled "Detect Attack," will be discussed with exemplary reference to FIGS. 1B, 2B, and 3, without limitation.

Certain steps in process 400, as well as other processes disclosed herein, may need to naturally precede others for the present invention to function appropriately or as described. However, the present invention is not limited to the order of the steps described if such order or sequence does not alter the functionality of the present invention to the level of nonsensical or render the invention inoperable. Accordingly, it is recognized that some steps may be performed before or after other steps or in parallel with other steps without departing from the scope and spirit of the present invention.

Certain exemplary embodiments of process 400 can be computer implemented, either partially or fully. Accordingly, the present invention can comprise multiple computer programs that embody the functions described herein and illustrated in functional block diagram and flowchart form. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the figures and associated description in the application text, for example.

Therefore, disclosure of a particular set of program code instructions is not considered necessary for an adequate understanding of how to make and use the present invention. The inventive functionality of the computer program aspects of the present invention will be explained in more detail in the following description in conjunction with the figures illustrating functions and program flow.

Instructions for performing steps of process 400 can be recorded on a computer-readable medium to support computer execution. A "computer-readable medium" can be any means that can store, provide, propagate, or transport a program for use by or in connection with an instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a RAM (electronic), a read-only memory (ROM) (electronic), an erasable programmable read-only memory (EPROM, EEPROM, or flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Referring now to FIG. 4, at step 405 of process 400, the attack detection system 150 receives network traffic 110 and feeds the network traffic 110 (for example a copy of the network traffic 110) to the countermeasure engine 225.

At step 410, the signature analyzer 205 of the countermeasure engine 225 conducts a signature analysis on the network traffic 110 and generates a result 206, which typically comprises a computed probability that the network traffic 110 contains an attack and a score indicating confidence in the computed probability.

The signature analysis can be based on a representation of malicious activity and can be characterized as fast, reliable, predictable, and inexpensive. The signature analysis can be based on prior knowledge of attacks or known vulnerabilities.

In an exemplary embodiment, the signature analyzer 205 compares the network traffic 110 to a set of attack signatures typically stored in memory or a signature database. Using the attack signatures, the signature analyzer 205 can analyzing network traffic 110 at visible open systems interconnection (OSI) network layers that are relevant. In certain embodiments, the signature analyzer analyzes traffic at OSI layers 3-7. In this manner, the signature analyzer 205 can detect "man-in-the-middle" attacks and buffer overflow attacks.

In certain exemplary embodiments, the attack signatures may be developed by trained analysts who are knowledgeable about methods and techniques used by hackers, and are capable of recognizing patterns in traffic that are indicative of attacks. In an alternative exemplary embodiment, attack signatures may be obtained from third parties, such as network security companies, universities, or other parties that generate attack signatures. In yet another alternative exemplary embodiment, attack signatures may be generated automatically. For example, attack signatures may be generated automatically using a computer system to seek patterns in traffic that has been identified as undesired or suspicious.

When network traffic 110 appears to match at least one signature, the signature analyzer 205 generates a probability and associated confidence of the network traffic 110 containing an attack, which is represented in the result 206.

At step 415 of process 400, the reputation analyzer 210 conducts a reputation analysis on the network traffic 110 and generates a result 211 comprising a probability that the network traffic 110 contains an attack and a confidence in that probability. The confidence can be represented as a number or score, for example. In an exemplary embodiment, the reputation analyzer 210 generates a score of the reputation of an Internet Protocol ("IP") address or user that generated the network traffic 110.

The reputation analysis can be based on information collected on threat sources from around the Internet to assess the veracity and safety of content or connections. The reputation analysis can be characterized as fast, reliable, and predictable and based on existing reputation knowledge.

In an exemplary embodiment, a header of one or more packets of the network traffic 110 can identify a party or network location that generated or sent the network traffic 110. That identity can be correlated with a reputation that is retrieved from a database, for example. If the sending entity has a bad reputation, the reputation analyzer 210 can generate a result 211 specifying a relatively high probability of the network traffic 110 containing an attack and a corresponding confidence in that probability.

In an exemplary embodiment, an address is deemed as legitimate following a substantial history of transmitting legitimate traffic. Likewise, an address can be deemed not reputable as a result of documenting a substantial history of transmitting malicious traffic.

The reputation analyzer 210 assesses intent of a user or system that transmitted or initiated the network traffic 110. Reputations can follow a hierarchical model and can be shared throughout a client base, for example among all clients that are served by an attack detection system 150. In certain exemplary embodiments, reputations are maintained in a central database accessible by attack detection systems 150 serving multiple clients. Alternatively, reputations can be distributed across network nodes.

Reputation may be determined and adjusted on all levels of the hierarchy 300. For example, an individual client may contribute to the lowering of a reputation for an IP address because the IP address scanned that client or tripped a signature.

The reputation score of an entity can also be dynamically driven based on several inputs along the hierarchy 300. These inputs may include geography. Further, the reputation can be locally adjusted and transmitted or propagated throughout the hierarchy 300.

In certain exemplary embodiments, the signature, reputation, behavior, and pattern analyzers 205, 210, 215, 220 can exchange messages, collaborate, share information relevant to attack detection, and/or inform one another. If an IP address attempts to connect to a dark IP address, then the reputation of the IP address may decrease. Or if there is a substantial level of legitimate traffic is associated with the IP address, then the reputation of the IP address may increase.

At step 420, the behavior analyzer 215 conducts a behavior analysis on the network traffic 110 and generates a result 216 comprising a probability that the network traffic 110 contains an attack and a confidence in that probability. The confidence can be represented as a number or score, for example. In an exemplary embodiment, the result 216 comprises a score relating to the statistical abnormality of the network traffic 110.

In an exemplary embodiment, the network analysis comprises monitoring what is happening across multiple points on a network and aggregating monitoring data to identify anomalous behavior. In an exemplary embodiment, the network analysis comprises monitoring the network traffic 110 and noting unusual actions, atypical happenings, or departure from normal operation.

The behavior analyzer 215 can establish a baseline for network activity and then flag any unknown or unusual patterns that could constitute an indication of a threat or an attack. The behavior analyzer 215 can monitor bandwidth and protocols associated with the network traffic 110, both from a baseline perspective and towards identifying anomalous behavior. In this manner, the behavior analysis can identify new malware and zero-day exploits, even without pre-knowledge of attack specifics.

In certain exemplary embodiments, the behavior analyzer 215 can comprise or utilize commercially available technology or products. For example, the behavior analysis can be implemented using one or more products or services available from SecureWorks, Inc., Lancope Inc., Arbor Networks, or Mazu Networks, Inc.

At step 425, the pattern analyzer 220 conducts a pattern analysis on the network traffic 110 and generates a result 221 comprising a probability that the network traffic 110 contains an attack and a confidence in that probability. The confidence can be represented as a number or score, for example. In an exemplary embodiment, the result 221 comprises a score relating to one or more patterns of the network traffic 110.

In certain exemplary embodiments, the pattern analysis can comprise dynamically computing patterns of network and alert activity. A human analyst or a computer program can assess the resulting pattern, which can be filtered in the future, for example as needed. Accordingly, the pattern analysis can identify attacks without pre-knowledge.

In certain exemplary embodiments, the pattern analysis comprises statistical pattern recognition. Such pattern recognition can be applied to events occurring over a period of minutes, hours, days, or months.

In certain exemplary embodiments, the pattern analysis comprises data clustering. Such data clustering can find patterns in data that is unlabeled but that has many dimensions. Data clustering may learn and detect attacks without requiring a priori knowledge of attack specifics, for example. In one exemplary embodiment, the data clustering comprises hierarchical clustering. In one exemplary embodiment, the data clustering comprises partition clustering.

In certain exemplary embodiments, the pattern analysis comprises processing using fuzzy logic. For example, a fuzzy rule-based system can create sets of patterns, wherein the patterns help detect attacks.

In certain exemplary embodiments, the pattern analyzer 220 can detect attacks using neural networks, structural pattern recognition, or a known pattern analysis technology.

At step 430, the traffic profiler 230 identifies a profile 231 associated with the network traffic 110. As discussed above with reference to FIG. 2B, in certain embodiments, the profile 231 can be derived from or identified using one or more headers of the network traffic 110, such as headers of IP packets that the network traffic 100 comprises. In certain embodiments, the profile 231 can be identified by knowledge of the network site of the attack detection system 150 or a component thereof. In certain exemplary embodiments, the profile 231 can be determined according to the business entity or organization that the attack detection system 150 is serving.

At step 435, the weighting engine 250 computes a composite probability that the network traffic 110 contains an attack and an associated confidence in that probability. In an exemplary embodiment, the composite result 251, which may be one-dimensional or a vector having two or more dimensions, comprises a weighted combination of the results 206, 211, 216, and 221 as provided by the countermeasure engine 225. The weights can be set according to information obtained from the attack profile database 275 based on the profile 231. Accordingly, the weighting engine 250 can bias the relative contributions of the results 206, 211, 216, and 221 in computing a composite result 251. To this end, an exemplary embodiment of the weighting engine 250 comprises computer software that integrates multiple classes of countermeasures to increase detection of sophisticated attacks and to reduce false positives. Analyzing events from many perspectives instead of from a single perspective can limit or reduce false positive rate.

In an exemplary embodiment, the weighting engine 250 comprises a Bayesian network, a belief network, or a directed acrylic graphical model. For example, the weighting engine 250 can comprise a Bayesian network that weights inputs of various countermeasures to make a determination regarding whether an analyzed event (for example receipt of network traffic 110) comprises an attack. Such a Bayesian network can comprise a probabilistic model regarding random variable and associated conditional dependencies. In an exemplary embodiment, the Bayesian network represents probabilities between attacks and observations that may indicate an attack. From this information, the Bayesian network can compute probabilities of an actual attack.

In the illustrated embodiment, the weighting engine 250 utilizes four countermeasure classes as represented in the results 206, 211, 216, and 221, where each class can report on malicious, legitimate, or unknown risk. The signature analysis can comprise a set of representations of known malicious or known legitimate network traffic. The reputation analysis can represent the reputation of the user, device or IP address of the involved subject. The behavior analysis can represent network or user behavior and pattern as a sequence of events. The properties of pattern and behavior countermeasure classes can compensate for dependencies of signatures and reputation on pre-knowledge or information known a priori.

In an exemplary embodiment, the composite score can be adjusted based on criticality of the asset and the vulnerability stance of the target. For example, a low scored activity might warrant an aggressive response if the activity was targeting a critical asset known to be vulnerable to the attack. For example, action could be taken on a relatively low score when the target was a financial processing system, whereas the same score would be of less concern if the score related to a public printer. The response can also take into consideration the direction of an attack, for example.

In one exemplary embodiment, each result 206, 211, 216, and 221 provides a respective rating, for example high (3), medium (2), low (1), and legitimate (−6), where higher scores indicate higher attack probability. As discussed above, corresponding confidences can be also be assigned, for example on a scale of 1-10. The weighting engine 250 can then provide a composite rating based on the individual ratings. The composite rating, as represented in the composite result 251, can comprise a score representing risk level of an event, such as the transmission of the network traffic 110. A single high score of 3 or two more mediums scores of 2 could indicate malicious activity that should be escalated to an analyst or client.

Table 1 below illustrates two hypothetical scenarios for results 206, 211, 216, 221 from the signature analyzer 205, the reputation analyzer 210, the behavior analyzer 215, and the pattern analyzer 220 along with composite results 251. In the first scenario, the network traffic 110 has received a composite result 251 in the form of a score of 12. In the second scenario, the network traffic 110 has received a composite result 251 in the form of a score of 6. The composite results 251 in Table 1 reflect equal weighting of the signature, reputation, behavior, and pattern analyses in each scenario.

TABLE 1

| | Scoring example | | | | |
|---|---|---|---|---|---|
| Scenario | Signature Analysis | Reputation Analysis | Behavior Analysis | Pattern Analysis | Composite Result |
| 1. First attack for a client for a well-known attack from a well-known attacker | High  3 | Attacker  3 | Unique  3 | Unrecognized  3 | 12 |
| 2. A possible attack from a possible attacker occurring infrequently with an unrecognized pattern | Low  0 | Unknown  2 | Infrequent  2 | Unrecognized  2 | 6 |

However as discussed above, the weights may be adjusted based on information in the attack profile database 275 and/or other factors. For example, the analyses scores for two scenarios may be weighted according to criticality of the device receiving the network traffic, to result in a composite score 251 that was weighted according to asset criticality. If the second scenario was for network traffic 110 addressed to a financial system of a bank, while the first scenario was for network traffic 110 destined for a public printer, then the prioritization could be reversed. The composite results could be weighted so that scores for transmissions to a public printer were multiplied by 0.5, while the scores for the financial system could be amplified by a factor of 5. In such circumstances, the first scenario would produce a composite result 251 of 6 (12×0.5=6), while the second scenario would generate a composite result 251 of 30 (6×5=30).

The exemplary results 206, 211, 216, and 221 provided in Table 1 also support an example of the weighting engine 250 utilizing attack profile information for results weighting. For example, suppose the traffic profiler 230 determined that the profile 231 of the network traffic 110 under analysis for the second scenario matched a profile 231 of historical traffic represented in the attack profile database 275 and deemed to have contained an actual attack. Further suppose that the attack profile database 275 indicated that the historic traffic containing the actual attack had received a result 206 of 0 for a signature analysis, a result 211 of 3 for a reputation analysis, a result 216 of 2 for a behavior analysis, and a result 221 of −6 for a pattern analysis. With such data, the attack profile database 275 would indicate that reputation and behavior analyses have demonstrated high predictive strength in identifying actual attacks. The result 216 of the behavior analysis and the result 211 of the reputation analysis on the current network traffic 110 can be weighted relatively heavily to reflect such historical performance. Meanwhile, under-performing analyses can be weighted lightly. For example, the signature analysis can be assigned a weight of 1, the reputation analysis a weight of 10, the behavior analysis a weight of 5, and the pattern analysis a weight of 0. Applying these weights, the composite result 251 can be computed as follows:

weighted signature analysis: 0×1=0;
weighted reputation analysis: 2×10=20;
weighted behavior analysis: 2×5=10;
weighted pattern analysis: 2×0=0; and
composite result 251=0+20+10+0=30.

This example computes the composite result 251 based on applying linear scaling to the results 206, 211, 216, 221. Various other formulas and computational processes can be implemented. Additionally, weights can be applied to confidence scores. For example, weights can be based on statistical analyses, regressions, nonlinear formulas, and other methodologies available to those of ordinary skill in the art having benefit of this disclosure. Such persons can use this disclosure and their ordinary skill to implement other such computation schemes readily and without undue experimentation.

In certain exemplary embodiments, weights are assigned and/or adjusted on a packet-by-packet basis. Accordingly, weights can change throughout a day or between hours, minutes, seconds, or fractions of a second.

In certain exemplary embodiments, weights can be based on input from a person or group of persons, such as one analyst or a team of skilled analysts. In certain exemplary embodiments, weights are initially assigned based on human input and are later refined or optimized with a computer program, automatically. In certain exemplary embodiments, weights are assigned, computed, and refined entirely automatically.

As shown in Table 2 below, weights can be assigned on a basis of level of the hierarchy 300. In certain exemplary embodiments, weights are assigned and/or adjusted on an industry basis. In certain exemplary embodiments, weights are assigned and/or adjusted on a client basis. In certain exemplary embodiments, weights are assigned and/or adjusted on a site basis. In certain exemplary embodiments, weights are assigned and/or adjusted on a device basis.

In the example that Table 2 illustrates, a total signature result ST can be computed based on weighted signature analyses results SG, SI, SC, SS, and SD conducted across the levels of the hierarchy 300. A total reputation result RT can be computed based on weighted reputation analyses results RG, RI, RC, RS, and RD conducted across the levels of the hierarchy 300. A total behavior result BG can be computed based on weighted behavior analyses results BG, BI, BC, BS, and BD conducted across the levels of the hierarchy 300. A total pattern result PT can be computed based on weighted pattern analyses results PG, PI, PC, PS, and PD conducted across the levels of the hierarchy 300. A composite result CR can be computed by weighting and combining the total signature, reputation, behavior, and pattern results ST, RT, BT, and PT.

TABLE 2

| Hierarchy Assignment Example | | | | | |
|---|---|---|---|---|---|
| Analysis | Level of Hierarchy | | | | |
| by Class | Global | Industry | Client | Site | Device | Total |
| Signature | SG | SI | SC | SS | SD | ST |
| Reputation | RG | RI | RC | RS | RD | RT |
| Behavior | BG | BI | BC | BS | BD | BT |
| Pattern | PG | PI | PC | PS | PD | PT |
| | | Composite Result: | | | | CR |

As discussed above, when a company first deploys the attack detection system 150, the system can immediately leverage previously deployed system experiences (for example of other companies or clients) to deliver attack detection service. Using the experiences of other clients, the attack detection system 150 can help reduce false positive rate and false negative rate upon startup, thereby avoiding a lengthy learning lag. In certain exemplary embodiments, the signature analyzer 205, the reputation analyzer 210, the behavior analyzer 215, and the pattern analyzer 220 can each maintain hierarchical information supporting scores for each countermeasure class. For example, the attack detection system 150 can maintain reputation, behavior, and pattern information on each level of the hierarchy 300, from global to device, as illustrated in FIG. 4 and/or Table 2 above.

The weighting engine 250 can use this information to make decisions based on the most specific being more relevant than the least specific or based on the most severe score in the hierarchy. This capability is advantageous in situations involving new client behavior or when an IP address is analyzed for the first time for a particular client, as pertinent information may be well known to other clients in the same industry or to all clients. Leveraging gained knowledge from a global client base supports using accumulated experience and knowledge across the entire client base.

From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present inven-

What is claimed is:

1. A method for assessing whether a communication contains an attack, the method comprising:
maintaining, by an attack detection device, a database comprising attack profiles aggregated from remote network sites, the attack profiles characterizing attacks according to a plurality of hierarchical parameters and according to results of a plurality of countermeasure assessments;
receiving the communication;
associating the plurality of hierarchical parameters with the communication;
applying the plurality of countermeasure assessments to the communication, each countermeasure assessment producing a respective probability that the communication contains an attack and a respective confidence score for the respective probability;
producing a composite probability that the communication contains an attack and a composite confidence score for the composite probability in response to processing each of the respective probabilities and each of the respective confidence scores that weights each of the respective probabilities by referencing the plurality of hierarchical parameters of the communication to one or more of the attack profiles in the database;
determining that the communication contains a new attack based on the composite probability and the composite confidence score; and
updating the database to include a new attack profile associated with the new attack;
wherein:
updating the database according to new attacks comprises automatically updating the database in response to determining that the composite probability exceeds a first threshold and that the composite confidence exceeds a second threshold; and
the remote network sites comprise clients of a business that provides attack detection equipment or services.

2. The method of claim 1, wherein:
a computer program further weights each of the respective confidence scores by referencing the associated plurality of hierarchical parameters of the communication to one or more of the attack profiles in the database; and
the communication comprises network traffic.

3. The method of claim 1, wherein the updating comprises automatically updating the database in response to determining that the communication contains an attack, and wherein the communication comprises a log message.

4. The method of claim 1, wherein;
the applying comprises conducting on the communication one of a signature analysis, a behavior analysis, a reputation analysis, and a pattern analysis; and
the remote network sites comprise a portion of all installations of an attack detection product provided to multiple business entities by an organization.

5. The method of claim 1, wherein the applying comprises conducting a signature analysis, a behavior analysis, a reputation analysis, and a pattern analysis.

6. The method of claim 1, wherein the maintaining comprises maintaining attack profiles that characterize attacks according to industry, client, site, device, and results of a plurality of countermeasure assessments.

7. The method of claim 1, wherein;
the maintaining comprises maintaining attack profiles that characterize attacks according to industry, client, site, device, and results of the plurality of countermeasure assessments; and
the plurality of countermeasure assessments comprises a signature countermeasure, a reputation countermeasure, a behavior countermeasure, and a pattern countermeasure.

8. The method of claim 1, wherein:
updating the database according to new attacks comprises automatically updating the database in response to a computer program determining that the composite probability exceeds the first threshold and that the composite confidence exceeds the second threshold; and
the method further comprises:
transmitting an alert over a network in response to a determination that the composite probability exceeds a third threshold that is different than the first threshold and that the composite confidence exceeds a fourth threshold that is different than the second threshold; and
adjusting weights of respective probabilities according to attack identification performance.

9. A method for assessing whether communications contain attacks, the method comprising:
determining, by an attack detection device, a plurality of hierarchical parameters of communications ascertainable from destination addresses;
applying a plurality of countermeasures to communications to produce countermeasures test results, each characterizing a probability and a confidence of an attack;
maintaining a database containing profiles of communications containing attacks on diverse entities, wherein each profile comprises the plurality of hierarchical parameters and the countermeasures test results for a communication deemed to have contained an attack;
selecting a combination of the countermeasures test results for assessing whether a current communication contains an attack based on a profile identified by referencing the plurality of hierarchical parameters of the current communication to the database;
computing a first probability and a first confidence of the current communication based on the selected combination of the countermeasures test results; and
automatically updating the database with a profile of the current communication in response to determining that the first probability and the first confidence exceed a threshold.

10. The method of claim 9, wherein the plurality of countermeasures comprise a signature analysis, a behavior analysis, a reputation analysis, and a pattern analysis.

11. The method of claim 10, wherein the plurality of hierarchical parameters comprise one of economic sector, corporate entity, site, and device.

12. The method of claim 9, wherein the plurality of hierarchical parameters comprise economic sector, corporate entity, site, and device.

13. The method of claim 12, wherein;
the selecting comprises weighting at least four test results with a respective nonzero weight; and
the diverse entities comprise a global set of companies.

14. The method of claim 9, wherein:
the selecting comprises computing a composite assessment of whether the current communication contains an attack using each of the countermeasures test results; and the composite assessment is biased towards one of the countermeasures test results relative to another one of the countermeasures test results according to the identified profile.

15. The method of claim 9, wherein the communication comprises a network traffic.

16. The method of claim 9, wherein the communication comprises a log message.

17. A method for assessing whether a communication contains an attack, the method comprising:
maintaining, by an attack detection device, a database comprising attack profiles aggregated from remote network sites, the attack profiles characterizing attacks according to a plurality of hierarchical parameters and according to results of a plurality of countermeasure assessments, wherein the maintaining comprises maintaining attack profiles that characterize attacks according to industry, client, site, device, and results of a plurality of countermeasure assessments, and the plurality of countermeasure assessments comprises a signature countermeasure, a reputation countermeasure, a behavior countermeasure, and a pattern countermeasure;
receiving the communication;
associating the plurality of hierarchical parameters with the communication;
applying the plurality of countermeasure assessments to the communication, each countermeasure assessment producing a respective probability that the communication contains an attack and a respective confidence score for the respective probability;
producing a composite probability that the communication contains an attack and a composite confidence score for the composite probability in response to processing each of the respective probabilities and each of the respective confidence scores that weights each of the respective probabilities by referencing the plurality of hierarchical parameters of the communication to one or more of the attack profiles in the database;
determining that the communication contains a new attack based on the composite probability and the composite confidence score; and
updating the database to include a new attack profile associated with the new attack.

18. The method of claim 17, wherein:
a computer program further weights each of the respective confidence scores by referencing the associated plurality of hierarchical parameters of the communication to one or more of the attack profiles in the database; and
the communication comprises network traffic.

19. The method of claim 17, wherein the updating comprises automatically updating the database in response to determining that the communication contains an attack, and wherein the communication comprises a log message.

20. The method of claim 17, wherein;
the applying comprises conducting on the communication one of a signature analysis, a behavior analysis, a reputation analysis, and a pattern analysis; and
the remote network sites comprise a portion of all installations of an attack detection product provided to multiple business entities by an organization.

21. The method of claim 17, wherein the applying comprises conducting a signature analysis, a behavior analysis, a reputation analysis, and a pattern analysis.

22. The method of claim 17, wherein the maintaining comprises maintaining attack profiles that characterize attacks according to industry, client, site, device, and results of a plurality of countermeasure assessments.

23. The method of claim 17, wherein:
updating the database according to new attacks comprises automatically updating the database in response to a computer program determining that the composite probability exceeds a first threshold and that the composite confidence exceeds a second threshold; and
the method further comprises:
transmitting an alert over a network in response to a determination that the composite probability exceeds a third threshold that is different than the first threshold and that the composite confidence exceeds a fourth threshold that is different than the second threshold; and
adjusting weights of respective probabilities according to attack identification performance.

* * * * *